United States Patent
Arfsten et al.

(10) Patent No.: US 6,811,901 B1
(45) Date of Patent: Nov. 2, 2004

(54) NIOBIUM OXIDE-BASED LAYERS FOR THIN FILM OPTICAL COATINGS AND PROCESSES FOR PRODUCING THE SAME

(75) Inventors: Nanning J. Arfsten, Moorestown, NJ (US); James F. Gavlas, Mercerville, NJ (US)

(73) Assignee: Denglas Technologies, L.L.C., Moorestown, NJ (US)

( * ) Notice: Subject to any disclaimer, the term of this patent is extended or adjusted under 35 U.S.C. 154(b) by 0 days.

(21) Appl. No.: 09/437,948

(22) Filed: Nov. 10, 1999

Related U.S. Application Data (63) Continuation-in-part of application No. 09/201,599, filed on Nov. 30, 1998, now Pat. No. 6,410,173.

(51) Int. Cl.[7] .............................. B32B 9/00; B05D 1/18
(52) U.S. Cl. ...................... 428/701; 428/432; 428/697; 428/699; 428/702; 359/580; 359/586; 427/443.2
(58) Field of Search ................................ 359/580, 586; 428/432, 697, 699, 701, 702; 427/443.2

(56) References Cited

U.S. PATENT DOCUMENTS

| | | |
|---|---|---|
| 3,934,961 A | 1/1976 | Itoh et al. |
| 4,260,222 A | 4/1981 | Kozawa |
| 4,771,167 A | 9/1988 | Boulos et al. |
| 5,073,451 A | 12/1991 | Iida et al. |
| 5,089,743 A | 2/1992 | Okuda et al. |

(List continued on next page.)

FOREIGN PATENT DOCUMENTS

| | | |
|---|---|---|
| EP | 0 436 741 A1 | 7/1991 |
| EP | 0 515 847 A2 | 12/1992 |
| EP | 0 586 050 A1 | 3/1994 |
| EP | 0 942 316 A2 | 9/1999 |
| EP | 0942316 A2 * | 10/1999 |
| EP | 0 953 550 A1 | 11/1999 |
| EP | 0 728 712 B1 | 4/2000 |
| FR | 2 730 990 | 8/1996 |
| JP | 58-011772 A | 1/1983 |
| JP | 61-189501 | 8/1986 |
| SU | 823331 B | 4/1981 |

OTHER PUBLICATIONS

Nilgün Özer, et al., "Preparation and Properties of Spin-Coated $Nb_2O_5$ Films by The Sol–Gel Process For Electrochromic Applications", Thin Solid Films, (1996), pp 162–168, no month.

(List continued on next page.)

Primary Examiner—Jennifer McNeil
(74) Attorney, Agent, or Firm—Akin Gump Strauss Hauer & Feld, LLP (57) ABSTRACT

The invention includes a thin film optical coating having a layer comprising sol-gel derived niobium oxide which is capable of providing an index of refraction of at least about 1.90. The invention also includes a thin film optical coating having a layer comprising a sol-gel derived oxide system including niobium oxide and a second oxide component such as aluminum oxide and/or silicon oxide which is capable of providing an index of refraction of from about 1.60 to about 1.90. Also included in the present invention are processes for producing such thin film coatings. In the processes, a substrate is immersed in a mixture comprising niobium chloride and an alcohol, withdrawn from the mixture, and heat-treated. The mixture may also include aluminum precursors and/or silicon precursors. The heat-treatment may occur at various temperatures, including those under 200° C.

6 Claims, 3 Drawing Sheets

U.S. PATENT DOCUMENTS

| | | | |
|---|---|---|---|
| 5,254,392 A | | 10/1993 | Burns et al. |
| 5,362,552 A | | 11/1994 | Austin |
| 5,372,874 A | | 12/1994 | Dickey et al. |
| 5,399,435 A | | 3/1995 | Ando et al. |
| 5,450,238 A | | 9/1995 | Bjornard et al. |
| 5,460,888 A | | 10/1995 | Hashimoto et al. |
| 5,552,180 A | | 9/1996 | Finley et al. |
| 5,563,734 A | | 10/1996 | Wolfe et al. |
| 5,677,002 A | * | 10/1997 | Kirlin et al. |
| 5,728,456 A | | 3/1998 | Adair et al. |
| 5,891,556 A | | 4/1999 | Anderson et al. |
| 5,912,045 A | * | 6/1999 | Eisenhammer et al. |
| 5,948,481 A | * | 9/1999 | Yan et al. ............... 427/419.3 |
| 6,067,189 A | * | 5/2000 | Gillich |
| 6,068,914 A | | 5/2000 | Boire et al. |
| 6,074,730 A | | 6/2000 | Laird et al. |
| 6,120,891 A | * | 9/2000 | Balkus et al. |

OTHER PUBLICATIONS

H. Schroeder, "Oxide Layers Deposited From Organic Solutions", pp. 87–141 (1969), no month.

Stephen Parraud, et al., "Stabilization and Characterization of Nanosized Niobium and Tantalum Oxide Sols Optical Applications for High Power Lasers", *J. Am. Ceram. Soc.*, vol. 75, No. 8, pp. 2289–2292 (1992), no month.

R. Sempéré, et al., "Silica–Niobium Pentoxide Thin Films Using Sol–Gel Technology", *Journal of Non–Crystalline Solids,* vol. 147 & 148, pp. 499–502 (1992), no month.

Nilgün Özer, et al., "Optical and Electrochemical Characteristics of Niobium Oxide Films Prepared By Sol–Gel Process and Magnetron Sputtering A Comparison", *Solar Energy Materials and Solar Cells,* vol. 40, pp. 285–296 (1996), no month.

G. Rob Lee, et al., "Electrochromic Niobuim Pentoxide and Niobium Pentoxide/Silicone Composite Thin Films Prepared by Sol–Gel Processing", *J. Mater. Chem.,* vol. 1 (3), pp. 381–386 (1991), no month.

P. Griesmar, et al., "Sol–Gel Route to Niobium Pentoxide", *Chem. Mater.,* vol. 3, pp. 335–339 (1991), no month.

Bunsho Ohtani, et al., "Electrochromism of Niobium Oxide Thin Films Prepared by the Sol–Gel Process", *J. Electrochemical Society,* vol. 141 (9) pp. 2439–2442 (1994), no month.

* cited by examiner

Fig. 5

NIOBIUM OXIDE-BASED LAYERS FOR THIN FILM OPTICAL COATINGS AND PROCESSES FOR PRODUCING THE SAME

CROSS-REFERENCE TO RELATED APPLICATION

This application is a continuation-in-part of U.S. patent application Ser. No. 09/201,599, filed Nov. 30, 1998, which issued as U.S. Pat. No. 6,410,173B1 on Jun. 25, 2002.

BACKGROUND OF THE INVENTION

Thin film optical coatings can be used to alter a substrate's optical properties. For example, the reflection of light which occurs at the interface of two different materials may be altered by applying a thin film optical coating to a surface at such an interface. Additionally, the transmission of light can be reduced by an absorbent optical coating or the transmittance/absorbance of specific wavelengths can be enhanced.

It is often desirable to reduce the percentage of visible light which is reflected at an interface and increase the transmittance of visible light, thus reducing glare associated with the reflection of visible light. Antireflection thin film optical coatings for such purposes have numerous applications including, for example, windows, lenses, picture frames and visual display devices such as computer monitors, television screens, calculators and clock faces.

Generally, the reflection of light occurs at the interface of two materials which have different indices of refraction, for example, glass and air. Air has an index of refraction of approximately 1.00 and glass generally has an index of refraction of approximately 1.51, so that when light which was previously travelling through air becomes incident upon a glass surface, some of the light is refracted (bent) and travels through the glass at an angle different from the angle of incidence, and some of the light is reflected. Theoretically, in order to minimize the amount of light which is reflected from a glass surface, it would be ideal to coat the glass with a material having an index of refraction which is the square root of 1.51, which is the index of refraction of glass. However, there are very few durable materials which have such a specific index of refraction (i.e., 1.2288).

In order to overcome the problem created by the lack of durable materials having the requisite index of refraction, thin film coatings having multilayer designs have been developed. Prior multilayer antireflection coatings have included two, three, four and more layers. By using multilayer coatings with layers that have high, medium and low indices of refraction, in various combinations and orders, prior coating systems have been able to reduce the reflection of visible light at air/substrate interfaces to negligible percentages. However, each layer in a multi-layer coating system increases the overall cost of the coating system.

The are many different examples of multilayer coating systems that have previously been used. Two, three and four layer antireflection coatings are known and are described, for example, in H. A. Macleod, "Thin Film Optical Filters," Adam Hilger, Ltd., Bristol 1985. The coatings are designed to provide specific indices of refraction for different applications to deliver required optical properties. Indices of refraction are material constants. The index of refraction of a material, the amounts of a material, the combinations of materials and layer thicknesses all affect the optical properties of the resulting system. One such system commonly used is a "three-layer low" multilayer coating which has a medium index of refraction layer ("M-layer") coated on the substrate, the M-layer having an index of refraction ("n") of from 1.60 to 1.90, a high index of refraction layer ("H-layer") coated on the M-layer, the H-layer having an n greater than 1.90, and a low index of refraction layer ("L-layer") coated on the H-layer, the L-layer having an n less than 1.60, (thus providing an overall M/H/L structure). Other designs include bilayer coatings which generally have an M/L design which includes an inner M-layer and an outer L-layer. Such designs are useful, for example, with laser optic applications. Four layer systems are also known which generally have an H/L/H/L design and include an inner H-layer coated with an L-layer followed by a further H layer and L layer. Such coatings are typically used for technical applications which need to accommodate a somewhat greater amount of light passing through the coating then for standard applications.

Materials which are currently used in thin film optical coatings as layers having a high index of refraction include titanium oxide, hafnium oxide and other transition metal oxides. However, in order to produce durable coating layers of these high index of refraction materials, it is often necessary to use expensive techniques such as vacuum evaporation or sputtering. The cost of the equipment used in such application processes can often create an economically unviable approach to producing such coatings.

Other techniques by which layers of thin film optical coatings have been applied to substrates include the use of sol-gel technology. A common sol-gel technique includes the application of a solution to a substrate, with the subsequent conversion of an oxide precursor contained within the solution, to an oxide on the surface of the substrate. This method generally involves the removal of water by heat treatment. An alternative and more recently adapted technique of sol-gel chemistry involves the application of a colloidal suspension (sol) of a chemically converted oxide to a substrate with the subsequent evaporation of the suspending medium at room temperature. The first method is usually preferable due to the difficulties which may be encountered during the preparation of adequate colloidal suspensions.

The use of sol-gel chemistry in applying thin film optical coatings is desirable due to the prohibitive capital expenses associated with vacuum deposition equipment. Unfortunately, however, conventional sol-gel processes offer few choices of high refractive index coating materials.

Niobium oxide has been suggested for electrochromic applications, but thus far, it has not been used to produce a high index of refraction layer in thin film optical coatings, except through expensive sputtering and chemical vapor deposition techniques. Sol-gel techniques using niobium alkoxide precursors (such as niobium pentaethoxide, $Nb(OCH_2CH_3)_5$) and niobium chloroalkoxide precursors (such as $NbCl(OCH_2CH_3)_4$) have been used to create electrochromic coatings. Electrochromic coatings exhibit a reversible color change by alternating anodic and cathodic polarization. These coatings are usually spin-coated and generally have substantial thicknesses (5–10 $\mu$m). Electrochromic materials are usually not very dense and are preferably amorphous to provide an open framework for rapid ionic diffusion. Electrochromic coatings are generally designed to be crack-free, but are not concerned with uniformity, or the absorption/transmission of light.

Niobium chloride and tetraalkoxysilane precursors have been used in combination in a molar ratio of 90:10 silicon to niobium as an L-layer material. Such precursor mixtures have produced materials with indices of refraction averaging approximately 1.55. It is generally well known and expected that combinations of two materials with differing indices of refraction will produce a material-mixture which has an index of refraction that is linearly and directly proportional to the molar ratio of the two components. For example, if one were to combine varying amounts of silicon dioxide and titanium dioxide ($TiO_2$) and measure the index of refraction of the material-mixture as a function of the molar proportion of $TiO_2$, a linear relationship would be observed. However, since precursor mixtures of silicon and niobium have been found to be unstable when niobium exceeds 10 mole %, these materials have not been heavily investigated. Precursors with greater than 10 mole % of niobium tend to undergo rapid gelation, rendering them ineffective for most sol-gel techniques.

While, sol-gel preparations have generally become a popular investigative topic in the field of thin film optical coatings, sol-gel niobium oxide materials are not known to have high indices of refraction.

When a sol-gel method is used to coat a substrate, the coating that is deposited generally requires a final heat cure to convert the coating into the desired oxide. A common cure temperature used in sol-gel applications is approximately 400° C. There are many materials that have melting or decomposition points below 400° C., including, for example, certain plastics and other polymeric resins. Thus, thin film optical coatings cannot be coated on a large class of materials (i.e., those with melting points below 400° C.) using conventional sol-gel processes. Currently, heat-sensitive materials are coated by vacuum deposition.

Thus, there exists a need in the art for a durable material for use as a layer having a high index of refraction in a thin film optical coating which can be prepared in a relatively inexpensive manner. Additionally, inexpensive materials for use as layers having a medium index of refraction are also desired. Lastly, materials which are capable of providing high index of refraction layers on heat-sensitive materials are needed.

BRIEF SUMMARY OF THE INVENTION

The present invention includes a thin film optical coating, having a layer comprising sol-gel derived niobium oxide, wherein the layer is capable of providing an index of refraction of at least about 1.90.

The present invention also includes a process for producing a thin film optical coating on a substrate, comprising: immersing the substrate in a mixture comprising niobium chloride and an alcohol; withdrawing the substrate from the mixture to provide the substrate with a coating of the mixture; and heat-treating the substrate to form a niobium oxide-based layer having an index of refraction of at least about 1.90.

The present invention also includes a thin film optical coating, having a layer comprising a sol-gel derived oxide system, the sol-gel derived oxide system comprising niobium oxide, silicon dioxide and aluminum oxide, wherein the layer is capable of providing an index of refraction of from about 1.60 to about 1.90.

The present invention further includes a process for producing a thin film optical coating on a substrate, comprising: immersing the substrate in a mixture comprising niobium chloride, a silicon precursor, an aluminum precursor, and an alcohol, wherein the molar ratio of niobium to silicon is from about 0.9:1 to about 3.6:1 and the molar ratio of niobium to aluminum is from about 0.8:1 to about 3.0:1; withdrawing the substrate from the mixture to provide the substrate with a coating of the mixture; and heat-treating the substrate to form a layer having an index of refraction of from about 1.60 to about 1.90.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings embodiment(s) which are presently preferred. It should be understood, however, that the invention is not limited to the precise arrangements, instrumentalities, or the specific information shown. In the drawings.

DETAILED DESCRIPTION OF THE INVENTION

It has been surprisingly found that a layer of niobium-oxide based material having a high index of refraction, suitable for use in a thin film optical coating, can be provided using sol-gel chemistry. Furthermore, it has been unexpectedly found that low temperature cures can provide high index of refraction layers, thus allowing for the layers in accordance with the present invention to be applied to heat-sensitive substrates. Thus, thin film optical coatings having high index of refraction layers can be produced using relatively inexpensive technology.

Layers comprising a sol-gel derived niobium oxide can be coated onto substrates alone, or in conjunction with other layers as part of a multilayer thin film optical coating system. The niobium oxide (e.g., $Nb_2O_5$) can be derived from a sol-gel process which employs a precursor mixture including niobium chloride and an alcohol. The sol-gel derived niobium oxide layer of the present invention is capable of providing an index of refraction of at least about 1.90, and preferably an index of refraction of at least about 1.95, and more preferably an index of refraction of at least about 2.00, such that it is suitable for use as a high index of refraction layer. The niobium oxide layer generally can be from about 35 nanometers ("nm") to about 300 nm in thickness, however thickness can be varied over a wide range of measurements for achieving different optical effects as described in more detail below.

The process for producing a sol-gel derived niobium oxide layer on a substrate in accordance with the present invention includes first immersing the substrate in a mixture having niobium chloride ($NbCl_5$) and an alcohol.

Alcohols which may be used include primary alcohols, such as methanol, ethanol, n-propanol and n-butanol, secondary alcohols such as isopropyl and sec-butanol, and tertiary alcohols such as t-butanol. Additionally, various polyhydroxy alcohols may be used including, for example, ethylene glycol, propylene glycol, 1,3-propanediol and 1,2-butanediol. The preferred alcohol is ethanol due to its ready availability. Water may also be added to the mixture. Typical water concentrations are from about 2% to about 15%. Initially, water may be provided in small amounts for providing additional reactive —(OH⁻) groups and for the purposes of dilution. If added, it is preferable to use deionized water so as to limit any impurities and to minimize any unwanted interactions with the mixture constituents which may cause, for example, precipitation. It is preferable to use anhydrous ethanol because water can be added in known, controlled amounts.

Niobium chloride used in the mixture of the present invention is generally in the form of solid niobium pentachloride, prior to mixing with an alcohol. Solid niobium chloride can be purchased through many domestic and international distributors and manufacturers, and can be prepared via known synthetic routes. Solid niobium chloride is moisture-sensitive and should be stored in a dry area. Though not wishing to be bound by theory, it is believed that niobium pentachloride reacts with an alcohol according to the following reaction, and thus, produces a niobium chloroalkoxide and hydrochloric acid:

$$NbCl_5 + ROH \rightarrow NbCl_{5-x}(OR)_x + HCl$$

According to the present invention, the concentration of niobium chloride in the reactant mixture should be from about 20 g/L to about 100 g/L, preferably from about 40 g/L to about 70 g/L, and more preferably from about 45 g/L to about 55 g/L. These concentrations correspond to equivalent concentrations of niobium oxide in the resulting coating solution of from about 10 g/L to about 50 g/L, preferably from about 20 g/L to about 35 g/L, and more preferably from about 22.5 g/L to about 27.5 g/L.

The niobium chloride (hereinafter also referred to as "the niobium oxide precursor"), as well as the silicon- and aluminum-precursors discussed in detail below, are usually provided in dilute form, for example, about 40 g/l, within the mixture. It should be understood that the amount in the mixture may be varied provided the criteria for dilution are satisfied. Those criteria include the presence of sufficient precursor necessary for providing the desired amount of metallic oxide in the final coating, as well as sufficient dilution so as to keep the precursor molecules separated until the solution is applied to the surface in order to avoid premature reaction in the coating solution. The coating and network forming reactions preferably occur on the substrate surface after immersion, coincident with withdrawal of the substrate from the solution, upon exposure to the ambient atmosphere and/or during subsequent heat treatment.

Mixtures in accordance with the present invention may optionally include other ingredients such as, for example, stabilizing agents. The stabilizing agents, for example, acids such as formic acid, acetic acid, propionic acid and citric acid, or chelating agents such as 2,4-pentanedione, diacetone alcohol and ethyl acetoacetate, are added in small amounts sufficient to carry out the function of complexing around the precursor molecules to stabilize the precursor molecules in solution. If an acid is used, it may also function to catalyze the condensation reactions which occur during the coating process.

Figure 1:
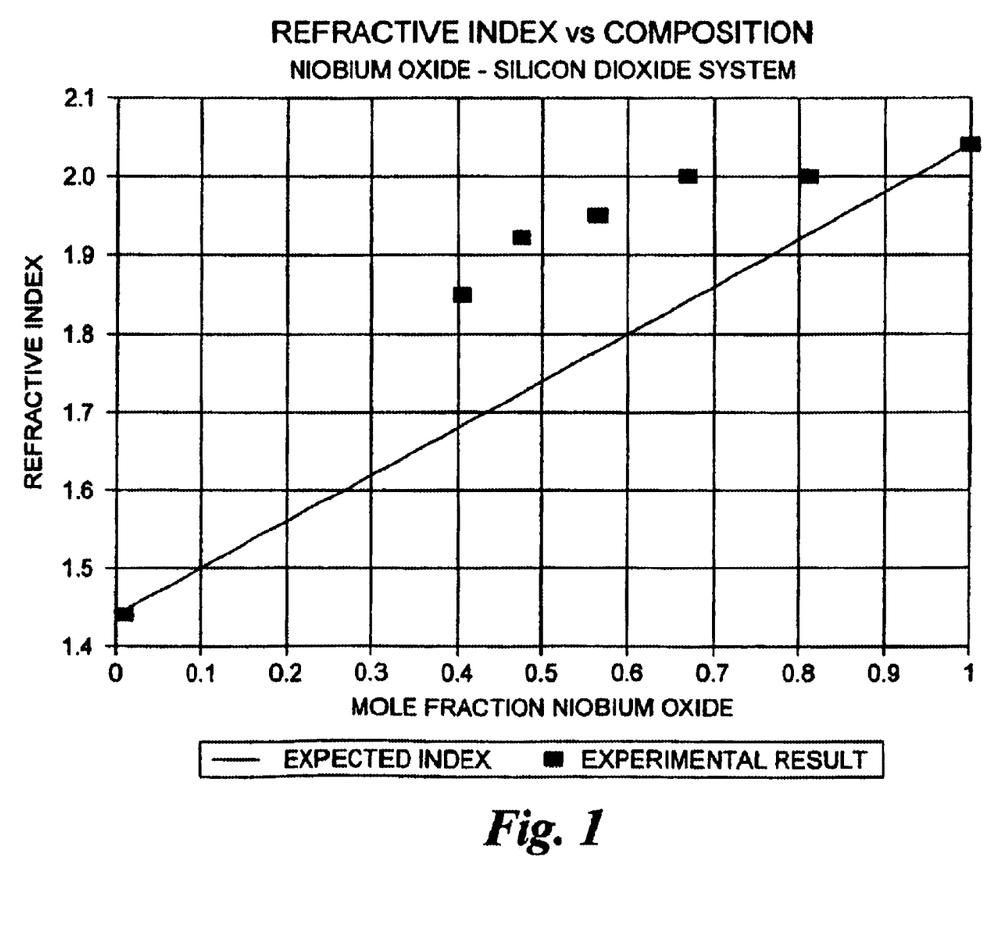
FIG. 1 is a graphical representation of the relationship between the index of refraction and mole fraction of niobium oxide in a material prepared in accordance with the present invention.

It has been surprisingly found that the coating layer may also include one or more additional components selected from silicon dioxide and/or aluminum oxide, in a mole fraction up to about 0.55 based on the total moles of the niobium oxide and the one or more additional components present in the coating layer, without lowering the layer's index of refraction below about 1.90. The inventors have surprisingly found that mixtures of niobium chloride and tetraalkoxysilanes are stable and do not undergo rapid gelation when the concentration of tetraalkoxysilane is equivalent to a silicon dioxide mole fraction in the coating layer of less than about 0.55. FIG. 1 illustrates the effect of adding additional components to the mixture. As shown by the solid line in FIG. 1, the index of refraction of a material including niobium oxide and silicon dioxide would be expected to increase linearly in direct proportion to increases in the mole fraction of niobium oxide present. However, the inventors have suprisingly found that the index of refraction of such materials is significantly higher than expected, as shown by the individual data points in FIG. 1. The cost of silicon precursors and aluminum precursors are substantially lower than niobium precursors and other H-layer precursors. Thus, a layer of a thin film optical coating having an index of refraction of at least about 1.90 can be prepared incorporating a significant amount of precursors which are less expensive than niobium precursors.

Silicon precursors suitable for use in the present invention include, for example, tetraalkoxysilanes, such as tetramethoxysilane, tetraethoxysilane and tetrapropoxysilane. Aluminum precursors suitable for use in the present invention include, for example, aluminum nitrate, aluminum chloride and aluminumalkoxides such as aluminum isopropoxide and aluminum sec-butoxide.

Medium index of refraction layers comprising niobium-oxide based materials can also be prepared in accordance with present invention. Contrary to the recognized instability of niobium/silicon mixtures where for niobium oxide concentrations of from about 2 to about 40 mole percent, it has also been found that thin film layers comprising niobium oxide, silicon dioxide and aluminum oxide can be prepared, which exhibit indices of refraction of from about 1.60 to about 1.90. The medium index of refraction layers in accordance with present invention can be prepared using sol-gel techniques, as described herein, using a different mixture. Normally unstable, rapidly gelling mixtures of niobium chloride and tetraalkoxysilanes, where the mole fraction of silane is from about 0.6 to about 0.95, are suprisingly stabilized by the addition of aluminum precursors. According to the present invention, a mixture including a niobium oxide precursor, a silicon precursor, an aluminum precursor and an alcohol, is stable when the precursors are present in the following approximate ratios. Mixtures for producing layers with indices of refraction of from about 1.60 to about 1.90 preferably contain a niobium oxide precursor, a silicon precursor and an aluminum precursor such that the molar ratio of niobium to silicon is from about 0.9:1 to about 3.6:1 and the molar ratio of niobium to aluminum is from about 0.8:1 to about 3.0:1; and more preferably wherein the molar ratio of niobium to silicon is from about 2.7:1 to about 3.6:1 and the molar ratio of niobium to aluminum is from about 2.3:1 to about 3.0:1.

Immersion of the substrate can be accomplished in a variety of ways. The particular manner in which the substrate is immersed is in no way critical to the present invention. Immersion can be accomplished by automated or manual means. It should also be understood that with respect to the present invention, immersion can mean both "full" immersion of the substrate into the mixture, as well as the partial immersion of the substrate into the mixture. The substrate is then withdrawn from the mixture, whereby the substrate is provided with a coating of the mixture. The duration of immersion is not critical and may vary. The coating remains on both sides of the surface of the substrate.

The film begins to thin due to evaporation of the alcohol. Alternatively, spin-coating methods may be used. As the evaporation occurs, there is a buffer zone of alcohol vapor above the surface of the coating film closer to the dipping solution. As the substrate moves away from the dipping solution, the vapor buffer decreases exposing the coating solution to atmospheric moisture and increasing the rate of reaction.

Acid can further catalyze the reaction. As the concentration of acid increases due to the evaporation of alcohol, the pH will begin to decrease. The chemical reactions are complex and their mechanisms are not fully understood. However, it is believed that the overall reaction rate is catalyzed by the changing (i.e., increasing) concentrations of reactive components, the evaporation of alcohol and the increase in water concentration as described above. The reactions occur in the zone extending longitudinally along the substrate surface as the alcohol is at least partially evaporated.

The substrate is preferably withdrawn from the mixture at a rate of from about 2 mm/s to about 20 mm/s. More preferably, the substrate is withdrawn from the mixture at a rate of from about 6 mm/s to about 12 mm/s. Withdrawal rate is known to affect coating thickness, as explained by H. Schroeder, "Oxide Layers Deposited from Organic Solutions", Physics of Thin Films, Vol. 5, pp. 87–141, (1969), (hereinafter referred to as "Schroeder"), the entire contents of which are incorporated herein by reference. While the rate at which the substrate is withdrawn is not absolutely critical, the ranges discussed above are generally preferred. It should be understood, however, that any rate could be used in accordance with the present invention in order to vary the resulting thickness, as desired. Also, as discussed in Schroeder, the angle at which the substrate is withdrawn has an affect on the coating thickness and uniformity. According to the present invention, it is preferable that the substrate is withdrawn from the solution such that the longitudinal axis of the substrate is approximately at a 90° angle with the surface of the mixture. While this withdrawal angle is preferable in order to provide even coatings to both sides of the substrate, it should be understood that the present invention may be practiced using any withdrawal angle.

Once the substrate has been withdrawn from the mixture, it may be subjected to intermediate heat-treatments, additional coating processes, and or final cure heat-treatments. The terms "heat-treatment" and "heat-treating" are understood to include either intermediate heating steps or final cure heating steps, or both, unless specified.

Intermediate heat-treating includes heating a substrate at a temperature from about 75° C. to about 200° C. for a period up to about one hour, more preferably from about 5 to about 10 minutes, in order to remove excess fluid. Fluids that may be contained within the coating present on the substrate can include, for example, water, alcohol(s), and acid(s). Final cure heat-treating includes heating a substrate at a temperature of up to about 450° C. Final cure heat-treating times ("soak times") can range from zero to about twenty-four hours, with the preferred soak time being from about 0.5 to about 2.0 hours.

With respect to temperature sensitive substrates heat treating is necessarily limited by the melting point of the substrate material. Temperature-sensitive substrates are those substrates comprising materials which have melting point temperatures approximately equal to or less than 450° C. Heat-treating in accordance with the present invention may include the heating of the substrate at temperatures less than 450° C., and as low as 75° C., preferably from about 90° C. to about 110° C., for a period of about one hour, or less, without significantly reducing the ability of the coating layer to exhibit a high index of refraction. Heat-treating may also include heat treatments at temperatures of less than about 200° C., or less than 150° C., but is not effective below a temperature of about 75° C. The layers for thin film optical coatings comprising sol-gel derived niobium oxide can be cured at these lowered temperatures. Heat-treatment at reduced temperatures (i.e., those temperatures less than 450° C.) can be conducted for less than one hour, such as for periods of less than one-half hour, or even for periods of less than 10 minutes, without significantly affecting the ability of the material to exhibit a high or medium index of refraction.

The low-temperature cured sol-gel derived niobium oxide layers exhibit high refractive indices and durability. This is highly advantageous since substrates which are temperature sensitive, such as for example, acrylics, polyalkylenes, polycarbonates and polystyrenes, can be coated with such materials. Furthermore, the ability to cure at a low temperature reduces the energy required for producing coatings even further, thereby reducing processing costs.

Both the high index of refraction layers and the medium index of refraction layers produced in accordance with the present invention can be incorporated into the same or different multilayer thin film optical coatings. One type of thin film optical coating in which the high index of refraction layers of the present invention can be incorporated is the three-layer low or M/H/L-type system. Other types of multilayer thin film optical coatings into which the high index of refraction layers in accordance with the present invention can be incorporated are, for example, the H/L/H/L-type system and bilayer systems. It should be understood, based on this disclosure that fewer layers, or even more layers, may be provided for different applications.

Figure 3:
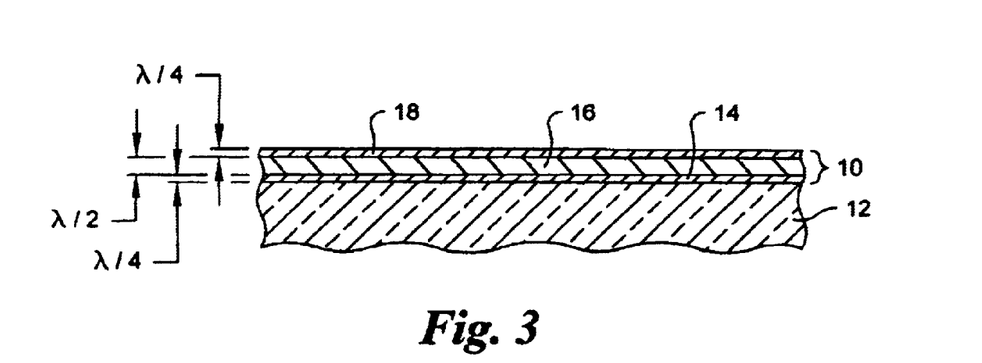
FIG. 3 is an enlarged, partially broken cross-sectional view of a portion of an M/H/L multilayer optical coating.
Figure 5:
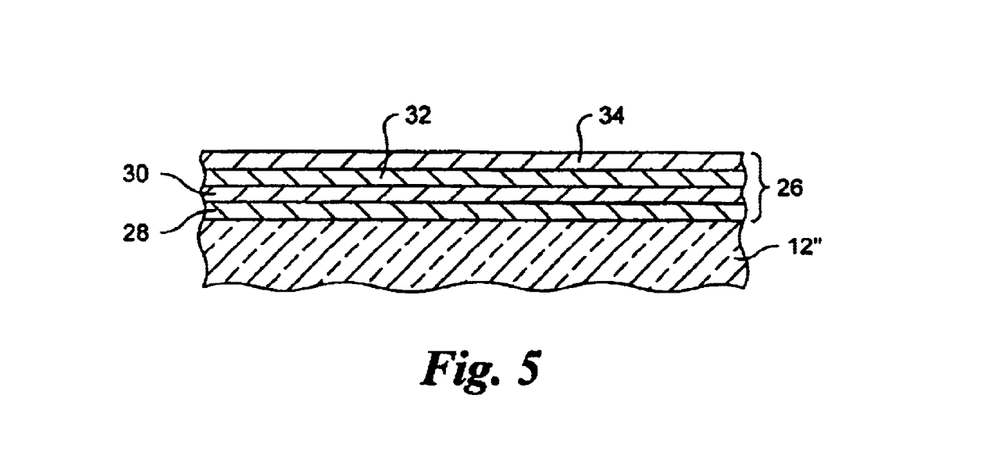
FIG. 5 is an enlarged, partially broken cross-sectional view of a portion of an H/L/H/L multilayer optical coating.

As shown in FIG. 3, an M/H/L multilayer coating design has an inner layer 14, a middle layer 16 and an outer layer 18. The inner layer 14 has a middle level index of refraction in a cured coating of from about 1.60 to about 1.90, preferably from about 1.68 to about 1.82, and is preferably applied in a thickness of $\lambda/4$ as measured in a direction transversely across the antireflection coating. If the coating is to have broad band antireflective properties, $\lambda$ is typically 550 nm. However, other values of $\lambda$ are possible if different antireflective optical properties are desired. The middle layer 16 is on the inner layer 14 as shown in FIG. 3. The middle layer preferably has a material of a high level index of refraction of at least about 1.90 after curing and a preferred thickness of 2 $X\lambda/4$, i.e., $\lambda/2$. The outer layer 18 on the middle layer 16 as shown in FIG. 5 is preferably a material of low index of refraction of about 1.60 or less after curing, such as, for example, silicon dioxide, and is located on the "air side" of the coating. The outer layer in the three layer low design preferably has a thickness of $\lambda/4$. While the preferred thicknesses of the layers are $\lambda/4$, $\lambda/2$ and $\lambda/4$, respectively, it should be understood by one skilled in the art, that thickness may be varied for modifying or customizing optical properties for various coating applications. The present invention includes an antireflection coated substrate which includes a substrate 12 coated with the multilayer antireflection coating 10 as described herein, wherein the inner layer 14 or middle layer 16, or both, include sol-gel derived niobium oxide in accordance with the present invention.

Figure 4:
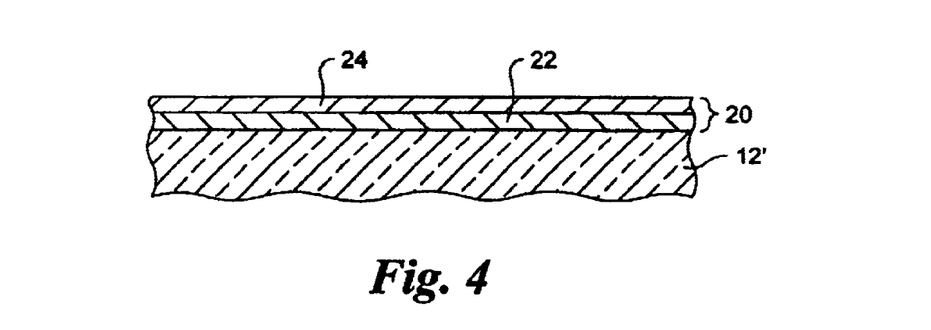
FIG. 4 is an enlarged, partially broken cross-sectional view of a portion of an M/L bilayer optical coating.

As shown in FIG. 4, an M/L multilayer coating design 20 has two layers, an inner layer 22 having a middle index of refraction in accordance with the present invention, and an outer layer 24 having a low index of refraction, an L layer. The outer layer 24 is preferably formed on the inner layer using the same sol-gel chemistry and coating techniques described above but with different materials, such as typical L-layer materials, for example, precursor solutions consisting entirely of silicon precursors. The outer layer 24 may include any of the same materials noted above with respect to the outer layer 18 of the multilayer antireflection coating 10. The present invention includes an antireflection coated substrate which includes an substrate 12' coated with the multilayer antireflection coating 20 as described herein, wherein inner layer 22 comprises a sol-gel derived niobium oxide-based material in accordance with the present invention.

As shown in FIG. 5, an H/L/H/L multilayer coating design has four layers, that is, an inner layer 28 having a high index of refraction, a second layer 30 having a low index of refraction, a third layer 32 having a high index of refraction and an outer layer 34 having a low index of refraction. The substrate 12" for use with such layers, preferably for technical applications which are intended to allow more light to pass through, can be for example, those described in H. K. Pulker, *Coatings On Glass* (Elsevier Publishing) 1984. It should be understood, based on this disclosure, that inner layer 28 and third layer 32 may comprise the same or different materials, provided the index of refraction is at an acceptably high level. Layers 30 and 34 are preferably the same material. However, as noted above with respect to layers 28 and 32, the outer layer 34 and the second layer 30 may have different materials provided they both achieve an acceptably low index of refraction of preferably about 1.54 or less. The present invention includes an antireflection coated substrate which includes an substrate 12" coated with the multilayer antireflection coating 26 as described herein, wherein either inner layer 28 and/or third layer 32 include a sol-gel derived niobium oxide as described above.

The invention will now be described based on the following non-limiting examples:

EXAMPLE 1

A mixture for preparing an H-layer was prepared by combining 61 grams of niobium pentachloride and 94 mL of 100% ethanol (anhydrous, denatured ethanol, SDA 2B-2), with stirring. After the niobium pentachloride had reacted with the ethanol, an additional 500 mL of ethanol and 25 mL of deionized water were added to the mixture. The mixture was then diluted to 1000 mL total volume with additional ethanol. This mixture was used in Example 4 to form a layer having an index of refraction of 2.03 on soda-lime float glass, and in Example 5 to form a layer having an index of rafraction of 1.96 on polycarbonate.

EXAMPLE 2

A mixture for preparing an M-layer was prepared as follows: 66 mL of ethanol, 25 mL of tetramethoxysilane, 22 mL of deionized water, and 2.6 mL of glacial acetic acid were mixed at room temperature with constant stirring. During the stirring, the viscosity was measured every hour until a viscosity of approximately 3.0 to 3.2 centistokes was reached, roughly indicating the preferred extent of hydrolysis and condensation. At this point, 0.66 mL of 69% nitric acid were added to the mixture and the mixture was diluted to 1000 mL with additional ethanol. A separate solution was prepared by dissolving 74 grams of aluminum nitrate (Al(NO$_3$)$_3$.9H$_2$O) in 1000 mL of ethanol. The second solution was then added to the previously prepared mixture. Finally, 500 mL of the resulting mixture were mixed with 500 mL of the H-layer mixture prepared in Example 1. This final mixture was used in Example 4 to form a layer having an index of refraction of 1.74.

EXAMPLE 3

A mixture for preparing an L layer was prepared by mixing 160 mL of ethanol, 93 mL of tetraethoxysilane, 54 mL of deionized water and 1 mL of hydrochloric acid (37%), while stirring at room temperature. During the stirring, the viscosity was measured every hour until a value of 3.0–3.2 centistokes was reached. A second solution was prepared by dissolving 2 grams of aluminum nitrate (Al(NO$_3$)$_3$.9H$_2$O) and 50 mL of ethanol. This solution was mixed with the mixture containing the tetraethoxysilane. The combined mixture was diluted to a final volume of 1000 mL with additional ethanol. This mixture was used in Example 4 to form a layer having an index of refraction of 1.46.

EXAMPLE 4

A three layer anti-reflection coating was applied to both sides of a 2 mm thick piece of soda-lime float glass using the niobium/silicon/aluminum M-layer mixture of Example 2, the niobium H-layer mixture of Example 1 and the silicon/aluminum L-layer mixture of Example 3. The cleaned piece of glass was first dipped in the M layer mixture of Example 2 and withdrawn vertically at a rate of 9 mm/s. The glass was subsequently dried in a oven for six minutes at approximately 170° C. After allowing the glass to cool to room temperature it was dipped into the H layer mixture of Example 1 and withdrawn vertically from that mixture at a rate of 15 mm/s. The glass was then dried again in an oven for six minutes at approximately 170° C. The glass was allowed to cool to room temperature and was then dipped into the L layer mixture and withdrawn vertically at a rate of 8 mm/s. The glass was then heated in a furnace at approximately 450° C. for one hour. Reflectivity of the coated glass sample was measured, at normal incidence, over a range of wavelengths of 425 to 675 nm and the average percent of reflection was found to be 0.74%. Reflectivity is shown graphically in FIG. 2.

EXAMPLE 5

A 3 mm thick piece of Lexan® polycarbonate was coated by dipping the polycarbonate sample in a niobium H layer mixture as prepared in Example 1. The coating was then heat treated for six minutes at 110° C. This was the only heat treatment to which the polycarbonate was subjected. A layer of durable material having an index of refraction at 566 nm of 1.96 was produced

TABLE I

| Wavelength (λ) (nm) | Percent Reflection (%) |
| --- | --- |
| 425 | 0.54 |
| 450 | 0.24 |
| 475 | 0.73 |
| 500 | 1.19 |
| 525 | 1.24 |
| 550 | 1.01 |
| 575 | 0.57 |
| 600 | 0.26 |
| 625 | 0.27 |
| 650 | 0.67 |
| 675 | 1.46 |

Figure 2:
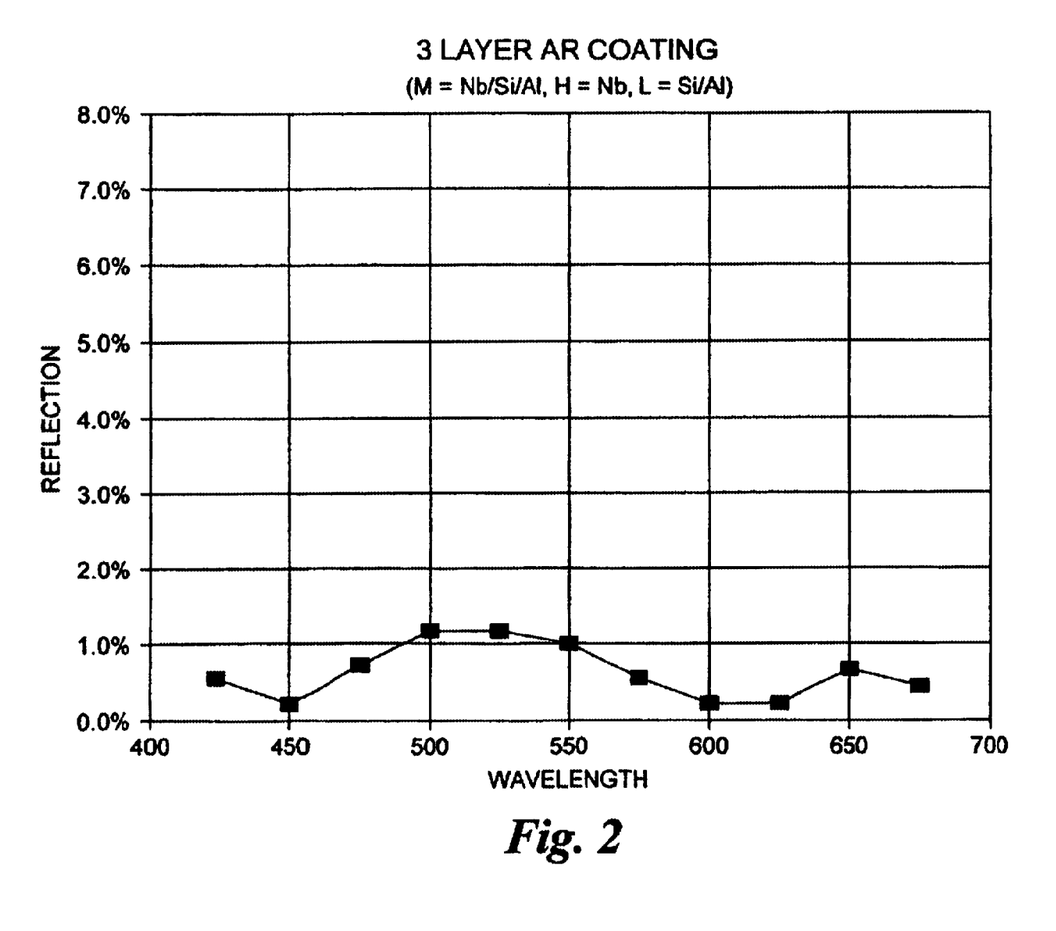
FIG. 2 is a graphical representation of the percent reflection for wavelengths ranging from 425 nm to 675 nm using the coated substrate prepared in Example 4.

From the above examples, it is evidenced that thin film optical coatings having a high index of refraction layer can be provided on a substrate using relatively inexpensive sol-gel techniques for application. The high index of refraction layer comprising niobium oxide was uniform, durable and dense. It was applied in accordance with a particular embodiment of the present invention, and required no expensive application equipment, such as sputtering devices or the like. As shown in Example 4, a "three-layer low" thin film optical coating can be provided on a substrate using a sol-gel derived, niobium oxide material as the high index of refraction layer. As shown in FIG. 2, the percent of light in the visible spectrum which is reflected from the substrate coated in accordance with Example 4, averages approximately 0.74%. Such a low level of reflection is well below the desired maximum amount of reflection usually tolerated for antireflection purposes.

The niobium oxide material obtained from the mixture of Example 1 provided a layer having an index of refraction of about 2.03 on soda-lime float glass. Previously, the only niobium-containing layers for thin film optical coatings which attained such high indices of refraction were prepared by expensive application procedures such as sputtering.

Furthermore, as evidenced by Example 2 and 5, a medium index of refraction layer can be provided using mixtures of niobium, silicon and aluminum in accordance with the present invention. Such a result is surprising due to the instability previously attached to niobium/silicon solutions having niobium concentrations above certain minimal levels. It has been found that the addition of aluminum precursors to a solution of niobium and silicon precursors can provide a stabilizing effect to the overall solution.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A coated substrate having a thin film optical coating, the coating having a layer comprising a sol-gel derived oxide system, the sol-gel derived oxide system comprising niobium oxide, silicon dioxide and aluminum oxide, wherein the layer is capable of providing an index of refraction of from about 1.60 to about 1.90.

2. A coated substrate having a thin film optical coating in accordance with claim 1, wherein the substrate has a melting point temperature less than or equal to about 450° C.

3. The coating in accordance with claim 1, wherein the niobium oxide is present in the layer in a mole fraction of from about 0.22 to about 0.53, the silicon oxide is present in the layer in a mole fraction of from about 0.29 to about 0.49, and the aluminum oxide is present in the layer in a mole fraction of from about 0.17 to about 0.29, each mole fraction being based on the total moles of niobium oxide, silicon oxide and aluminum oxide in the layer.

4. An optical filter comprising a thin film optical coating produced by:

(a) immersing the substrate in a mixture comprising niobium chloride, a silicon precursor, an aluminum precursor, and an alcohol, wherein the molar ratio of niobium to silicon is from about 0.9:1 to about 3.6:1 and the molar ratio of niobium to aluminum is from about 0.8:1 to about 3.0:1;

(b) withdrawing the substrate from the mixture to provide the substrate with a coating of the mixture; and (c) heat-treating the substrate to form a layer having an index of refraction of from about 1.60 to about 1.90.

5. A coated substrate having a thin film optical coating, the coating having a layer comprising a sol-gel derived niobium oxide, wherein the layer is capable of providing an index of refraction of at least about 1.90 and the layer comprising niobium oxide further comprises a second oxide selected from the group consisting of silicon dioxide and aluminum oxide, wherein the second oxide is present in the layer in a mole fraction of up to about 0.55 based on the total moles of niobium oxide and the second oxide in the layer.

6. A thin film optical coating for use on a substrate, having a layer comprising a sol-gel derived oxide system, the sol-gel derived oxide system comprising niobium oxide, silicon dioxide and aluminum oxide, wherein the layer is capable of providing an index of refraction of from about 1.60 to about 1.90 and the niobium oxide is present in the layer in a mole fraction of from about 0.22 to about 0.53, the silicon dioxide is present in the layer in a mole fraction of from about 0.29 to about 0.49, and the aluminum oxide is present in the layer in a mole fraction of from about 0.17 to about 0.29, each mole fraction begin based on the total moles of niobium oxide, silicon dioxide and aluminum oxide in the layer.

* * * * *